Aug. 12, 1958                E. S. CALVERT                2,847,668
              PILOT'S INDICATORS FOR AIRCRAFT INSTRUMENT
                       LANDING OR APPROACH SYSTEMS
Filed July 20, 1953                                    7 Sheets-Sheet 1

Inventor
EDWARD SPENCE CALVERT,
By
Robert B Pearson
            Attorney

Aug. 12, 1958     E. S. CALVERT     2,847,668
PILOT'S INDICATORS FOR AIRCRAFT INSTRUMENT
LANDING OR APPROACH SYSTEMS
Filed July 20, 1953     7 Sheets-Sheet 3

Inventor
EDWARD SPENCE CALVERT,
By
Robert B Pearson
Attorney

United States Patent Office 2,847,668
Patented Aug. 12, 1958

2,847,668
PILOT'S INDICATORS FOR AIRCRAFT INSTRUMENT LANDING OR APPROACH SYSTEMS

Edward Spence Calvert, Camberley, England, assignor to National Research Development Corporation, London, England, a British corporation Application July 20, 1953, Serial No. 369,181

Claims priority, application Great Britain July 30, 1952

19 Claims. (Cl. 343—107)

This invention relates to pilot's indicators for aircraft instrument approach or landing systems.

An ideal "approach path" is the line of intersection of two planes, namely an ideal "localiser" plane which is vertical and has its horizontal trace coincident with the extended centre line of the runway an ideal "glide slope" which is inclined at a small angle, of the order of 3 degrees, to the horizontal and has its horizontal trace intersecting the centre line of the runway at right angles at the "aiming point" towards which an aircraft is travelling in a straight line when making an ideal approach. In practice, localiser and glide slope radiators are used to produce localiser and glide slope radio beams and it is to these beams, not the ideal planes which they represent, to which a pilot's indicator responds.

In this specification and in the appended claims the following terms are used with the meanings stated:

*Runway line.*—The extended centre or general line of the runway.

*Flight path.*—The actual three dimensional path of an aircraft.

*Ground track.*—The plan of the flight path.

*Ground track error.*—The displacement of the ground track from the localiser plane or beam, measured perpendicular to the latter.

*Ground track heading error.*—The angle between the tangent to the ground track and the localiser plane or beam.

*Descent track.*—The elevation of the flight path, projected on to the localiser plane.

*Descent track error.*—The displacement of the descent track from the glide slope or glide slope beam, measured perpendicular to the latter.

*Descent track heading error.*—The angle between the tangent to the descent track and the glide slope or glide slope beam.

*Track.*—Ground or descent track.

*Track error.*—Ground or descent track error.

*Track heading error.*—Ground or descent track heading error.

For simplicity in what follows hereinafter and in the appended claims concerning ground track error—its amount, its rate of change (ground track heading) and the rate of change of its rate of change (rate of change of ground track heading),—descent track error is neglected or assumed to be negligible and the effects of any banking of the aircraft and of any cross wind are ignored, except where the contrary is apparent.

Also, for simplicity in what follows hereinafter and in the appended claims concerning descent track error—its amount, its rate of change (descent track heading) and the rate of change of its rate of change (rate of change of descent track heading),—ground track error is neglected or assumed to be negligible and the effects of any pitch attitude changes of the aircraft and any up or down wind are ignored, except where the contrary is apparent.

In order to bring his aircraft on to the approach path, i. e. to "close" it, and thereafter continue to follow it, i. e. to "hold" it, a pilot must close and hold both the localiser plane and the glide slope. He may close and hold both these planes in one operation, or may close and hold first one plane and then the other. He closes either plane by making the corresponding track error zero, but to hold it, he must ensure that both the corresponding track heading error and the rate of change of the track heading error are zero at the same moment as the track error is zero.

To consider the problem more generally, it is well known that objects in the field of view of an observer looking ahead from a fast moving vehicle or craft appear to him at any instant as in outward divergent motion from a single point towards which the vehicle or craft is preceding at that instant, i. e. a straight line from the observer's head to said point is tangential to the path of the observer's head. The pattern comprised by the divergent paths along which the perspective images of the objects appear to travel in the observer's picture plane is hereinafter referred to as the "streamer pattern." The origin of the streamer pattern, i. e. the point in the picture plane towards which the observer is proceeding and from which all objects seen appear to be diverging is hereinafter referred to as the "streamer point." In general, it may be said that the instantaneous static perspective picture tells the observer where he is in relation to the objects he sees aound him, i. e. his distances from these objects, and that the streamer pattern, by enabling him to pick out the streamer point, tells him where he is going. The faster a vehicle or craft is travelling the more its driver or pilot relies on the streamer pattern in steering or guiding it. In fact he uses the streamer pattern as a sighting device, and steers by turning so as to bring the streamer point on to his aiming point, having accomplished which he stops the turn and so maintains the coincidence of said points.

The pilot of an aircraft making a visual (as distinct from an instrument) approach judges his track errors at any moment by observing the relationship of the runway line and the aiming point therein to the horizon at that moment. He judges his track heading errors by observing the relationship of the streamer point to the aiming point in the runway line; the distances of the streamer point from the horizontal traces of the localiser plane and the glide slope (which traces intersect at the aiming point) corresponding to the ground track and descent track heading errors, respectively, and the velocities of the streamer point parallel to and perpendicular to the horizon corresponding to the rate of change of the ground track and descent track heading errors, respectively. The pilot's task is so to operate the controls, i. e. to apply rate of change of track heading, as firstly, to establish the perspective picture which means that the track errors are zero, and secondly, at the moment when this picture is established, not only to make the streamer point coincide with the aiming point which means that the track heading errors are zero, but, also at this moment, to bring the streamer point to rest (i. e. to stop the turn) which means that the zero track and zero track heading errors are not changing. If he succeeds in doing all this correctly, elements in the perspective picture will maintain constant relationships one to another, the perspective image of the runway line of the runway remaining perpendicular to the horizon and the images of the aiming point and the streamer point remaining coincident with one another on the runway line image at a constant distance below the horizon.

If visibility is so low that the pilot, although he can see enough to know where he is, i. e. his track error, cannot see enough to find the streamer point and so determine his track heading error, i. e. where he is going, then, although he may at one instant succeed in establishing the correct perspective picture, he will be unable to hold it and the aircraft will oscillate or "weave" about the approach path in a manner depending on its manoeuvrability.

It follows that, when flying on visual references, it is track heading and rate of change of track heading that the pilot manipulates in order to reduce track error and keep it at or near zero, i. e. to close and hold a desired track. In order efficiently to close and hold a desired track when flying without visual references, i. e. when flying by means of an approach indicator alone, the pilot must be able to visualise the closing process from the information presented to him by the approach indicator. He can make this visualisation and avoid weaving only if the approach indicator provides him with information as to track heading and rate of change of track heading, as well as track error. If the indicator gives the pilot these three pieces of information, then he will be able to use the same habits of thought in the non-visual (or instrument aided) portion of the approach as he does in the visual (or ground-light aided) portion, and the transition from non-visual to visual flight will be easy, quick and safe. The transition will be particularly easy if the three pieces of information are given to him in a manner analogous to that in which they are given to him by the visual perspective picture, i. e. by the shape of the picture, the position of the streamer point in the picture, and the velocity of the streamer point in the picture.

With this end in view, a pilot's instrument approach indicator according to the invention has indicator elements whose positions are indicative of track heading error as well as track error.

It is to be observed that it is not necessary for the indicator to present actual track error and actual track heading error and that it is sufficient for it to present corresponding indications to which a pilot can effectively react during an approach run in the same way as he would to the actual errors in establishing the necessary end condition in which all errors are held at zero or substantially so.

An indicator according to the invention is conventional in that it presents as indicative of track error a clear and definite indicator element position in accordance with a function of angular displacement of an aircraft from a radio beam about the source of the beam; but, in addition to this, it presents as indicative of track heading error a clear and definite indicator element position in accordance with a function of the rate of change of said angular displacement.

Thus, in an indicator according to the invention, indicator element positions indicative of track error are determined in accordance with a function of angular displacement of an aircraft from a radio beam about the source of the beam by means operative under the control of an amount signal derived from the beam, and indicator element positions indicative of track heading error are determined in accordance with a function of rate of change of said angular displacement by means operative under the control of a rate signal derived either from the radio beam or from a pre-set gyroscope or other directional reference datum device in the aircraft.

In general, a pilot's instrument approach indicator, according to the invention, will comprise two indicator elements having two relative motions, means operative under the control of radio beam signals for effecting the one relative motion in accordance with a function of angular displacement of the aircraft from a radio beam about the source of said beam, and means for effecting the other relative motion in accordance with a function of the rate of change of said angular displacement. If desired, the latter means may serve to effect said other motion in accordance with a function of the aircraft's track heading with reference to an adjustable datum afforded by a gyroscope or other directional reference device.

Generally also, except (as will be clear from what follows below) for reverse presentation (analogous to images in the pilot's perspective picture plane) indicative of descent track and descent track heading error the indicator will have two elongated indicator elements which have relative angular motion and relative translational motion, and preferably, one of said elongated elements will be fixed and the other mounted to swing about a pivot at one end thereof with respect to a zero position in which it is parallel to the fixed element, whilst said pivot is movable in a direction transversely of the fixed element with respect to a zero position in register with said fixed element.

In such case, an indicator may comprise, for direct presentation (analogous to plan projection) indicative of ground track error and ground track heading error, one upright and central fixed element, means operative under the control of localiser radio beam signals for moving the pivot of the movable element laterally from the central fixed element in accordance with a function of the angular displacement of the aircraft from a localiser radio beam about the source of said beam, and means, which preferably but not necessarily are operative under the control of said localiser beam signals, for swinging the movable element about said pivot from upright in accordance with a function of the rate of change of said angular displacement.

Also in such case, an indicator may comprise, for direct presentation (analogous to side elevational projection on to the localiser plane) indicative of descent track and descent track heading error, a transverse and central fixed indicator element, means operative under the control of glide slope radio beam signals for moving the pivot of the movable element upwardly and downwardly from the central fixed element in accordance with a function of the angular displacement of an aircraft from a glide slope radio beam about the source of said beam, and means, preferably but not necessarily operative under the control of said glide slope beam signals, for swinging the movable element about said pivot from parallelism with the fixed element in accordance with a function of the rate of change of said angular displacement.

Yet again in such case, an indicator may comprise for reverse presentation (analogous to projection on to the pilot's perspective picture plane) indicative of ground track error and ground track heading error, an upright and central fixed indicator element, means operative under the control of localiser radio beam signals for swinging the movable indicator element from upright in accordance with a function of angular displacement of the aircraft from a localiser radio beam about the source of said beam, and means, preferably though not necessarily operative under the control of said localiser beam signals, for moving the pivot of the movable element transversely from the central fixed element in accordance with a function of the rate of change of said angular displacement.

For reverse presentation (analogous to projection on to the pilot's perspective picture plane) indicative of descent track error and descent track heading error, however, such indicator elements having relative angular motion and relative translational motion are inappropriate; and preferably for this purpose, an indicator according to the invention comprises two indicator elements which are each movable up and down, means operative under the control of glide slope radio beam signals for moving the one movable element up and down from a datum, which may be indicated by a fixed third indicator element, in accordance with a function of angular displacement of the aircraft from the glide slope beam about the source of said beam, and means, preferably though not necessarily operative under the control of said glide slope beam radio signals, for moving the other movable element up and down from said datum in accordance with a function of the rate of change of said angular displacement. Preferably, a transverse fixed element representative of the horizon extends across the presentation at such distance above the datum that the fixed third element, when provided, is representative of the glide slope.

Indicator elements as set forth for reverse presentation indicative of ground track error and ground track heading error may be combined with elements as above set forth for reverse presentation indicative of descent track error and descent track heading error to comprise therewith a single presentation indicative of the total approach situation, and preferably the pivot of the swinging element is movable along a horizon element as set forth.

The invention will now be described with reference to the accompanying diagrammatic drawings of which:

Figures 10 a, b, c, d and f, are face views of the direct ground track presentation of Figure 1, Figures 11 a, b, c, d, e and f are face views of the direct descent track presentation of Figure 2, Figures 12 a, b, c, d, e and f are face views of the reverse ground track presentation of Figure 5 and Figures 13 a, b, c, d, e and f are face views of the reverse descent track presentation of Figure 6 corresponding to points a, b, c, d, e and f in the approach path of Figures 8 and 9;

Figures 1, 2, 7:
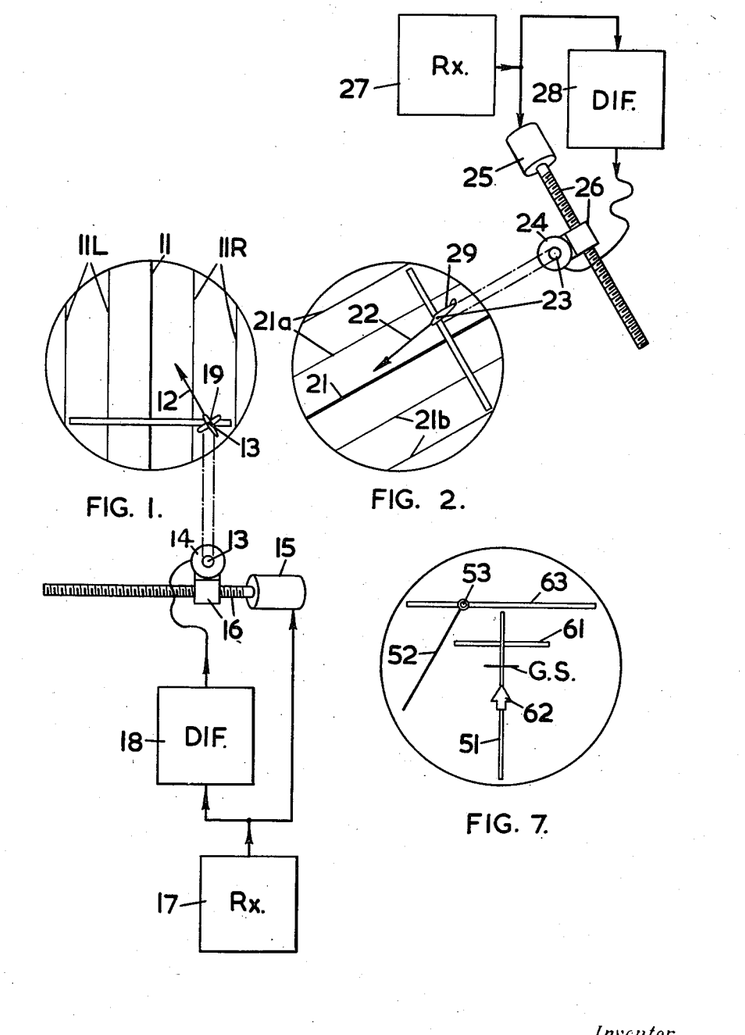
Figure 1 is a face view of a preferred form of direct presentation (analogous to plan projection) indicative of ground track and ground track heading error and including a block diagram representation of means for effecting indicator element motions.
Figure 2 is a face view of a preferred form of direct presentation (analogous to side elevational projection on to the localiser plane) indicative of descent track and descent track heading error and including a block diagram representation of means for effecting indicator element motions.
Figure 7 is a face view of a preferred form of combined reverse presentation (analogous to perspective projection on to the pilot's picture plane) indicative of ground track and ground track heading error and of descent track and descent track heading error as well.

The direct (ground track) presentation shown in Figure 1 has an upright and central fixed indicator element 11 and a movable element 12 which swings from upright about a pivot 13, and the pivot 13 moves laterally from the fixed element 11 to either side.

Figure 1 also shows a servo motor 14 for swinging the element 12 and a servo motor 15 and associated lead screw mechanism 16 for moving its pivot 13 (together with the servo motor 14) laterally. For controlling the servo motors 14 and 15, a radio receiver, indicated at 17, is connected directly with the pivot moving servo motor 15 and by way of a differentiator, indicated at 18, with the swinging servo motor 14. The receiver 17 provides at its output an amount signal which is a function of the angular displacement of an aircraft in which it is installed from a localiser radio beam about the source of said beam. The apparatus is set up so that the pivot 13 is on the fixed element 11 when this amount signal is zero and is moved to right or left of the fixed element 11 as said amount signal changes. The differentiator 18 provides at its output a rate signal which is a function of the rate of change of said angular displacement and the apparatus is set up so that the swinging element 12 is swung to right or left from upright as said rate signal changes.

To render the presentation more graphic the pivot 13 carries fast thereon a small plan representation 19 of an aircraft. The central fixed element 11 is representative of the runway line or the ideal straight ground track and the position of the pivot 13 with respect to the fixed element 11 is indicative of ground track error. The angular position of the swinging element 12 is indicative of ground track heading error (as also, incidentally, is the rate of motion of the pivot 13). The rate of swing of the swinging element 12 is indicative of rate of change of ground track heading error.

The direct (descent track) presentation and the means for operating it shown in Figure 2 are essentially similar to those of Figure 1. This presentation has a transverse and central fixed element 21 which is inclined downwardly to the left to be representative of the trace of the glide slope on the localiser plane. A moving element 22 swings from parallel to the fixed element 21 about a pivot 23 which carries fast thereon a small side elevational representation 29 of an aircraft, and said pivot 23 moves transversely from the fixed element 21 above and below it. Figure 2 also shows a servo motor 25 and associated lead screw mechanism 26 for moving the pivot 23. For controlling the servo motors 24 and 25, a radio receiver, indicated at 27, is connected directly with the pivot moving servo motor 25 and by way of a differentiator, indicated at 28, with the swinging servo motor 24. The receiver 27 provides at its output an amount signal which is a function of the angular displacement of an aircraft in which it is installed from a glide slope radio beam about the source of said beam. The apparatus is set up so that the pivot 23 is on the fixed element 21 when this amount signal is zero and is moved up or down from the fixed element 21 as said amount signal changes. The differentiator 28 provides at its output a rate signal which is a function of the rate of change of said angular displacement. The apparatus is set up, so that the moving element 22 is swung up or down from parallel as said rate signal changes. The fixed element 21 is representative of the glide slope and the position of the pivot 23 with respect to the fixed element 21 is indicative of descent track error. The angular position of the swinging element 22 is indicative of descent track heading error as also, incidentally, is the rate of motion of the pivot 23. The rate of swing of the swinging element 22 is indicative of rate of charge of descent track heading error.

Figure 3:
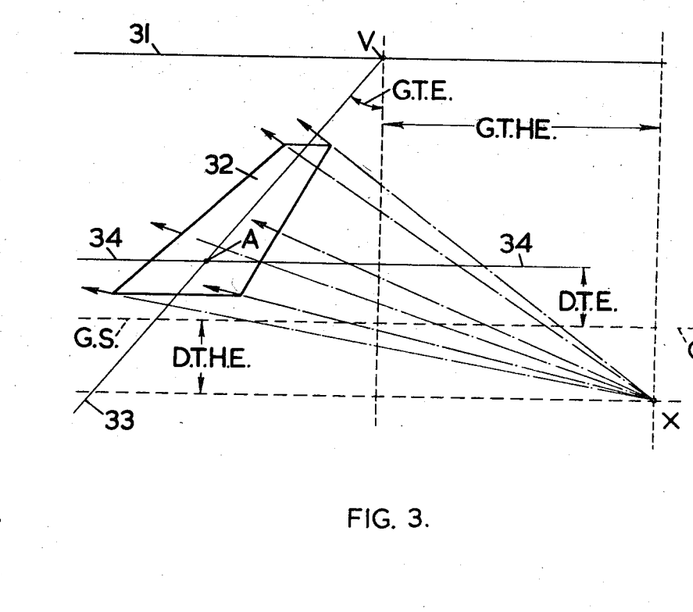
Figures 3 and 4 are typical perspective pictures as presented to a pilot during an approach run respectively before and after the errors have been corrected.
Figure 4:
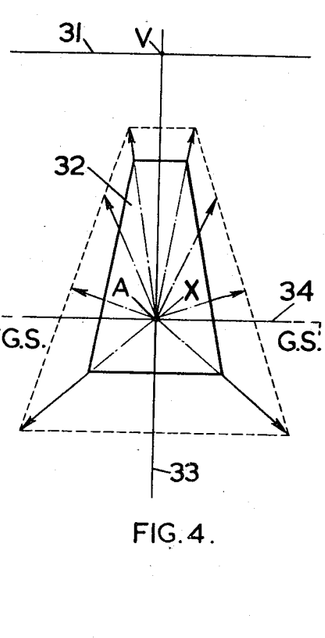

Referring now to Figures 3 and 4, these perspective pictures are typical of those presented in good visibility to the eyes of a pilot during an approach run before and after he has corrected the errors, respectively. It is, however, rare for a pilot to be consciously aware of such perspective pictures as such, for his flying training and his general as well as his flying experience have conditioned him to translate or interpret them, subconsciously and indeed almost instinctively, in terms of actuality; for example, he thinks of a long narrow rectangle of concrete which is the runway and not of a continuously changing tapering runway perspective picture plane image, or, in other words, he is consciously aware of the runway as a long narrow rectangle of concrete and is only subconsciously aware of the continuously changing tapering perspective image of the runway.

In Figures 3 and 4, the horizon image is represented by the line 31, the runway image is indicated by the quadrilateral 32, the runway line image is indicated at 33, the image of the horizontal track of the glide slope at 34, the aiming point image at A, and the streamer point at X. The chain line GS represents an imaginary datum corresponding to a desired descent track.

A pilot bringing in his aircraft in good visibility to the runway whose image is the quadrilateral 32 judges (almost instinctively) his track errors—where he is—at any moment from the relationship of the runway line image 33 and the aiming point image A therein to the horizon image 31 at that moment, and he judges his track heading errors—where he is going—from the relationship of the streamer point X to the aiming point A in the runway line image 33. The distance GTHE parallel to the horizon image 33 of the streamer point X from the vanishing point V at which the runway line image 33 meets the horizon image 31 corresponds to ground track heading error. The velocity of the streamer point X parallel to the horizon image 31 corresponds to the rate of change of ground track heading error. The distance DTHE of the streamer point X from the imaginary datum GS corresponds to descent track heading error. The velocity of the streamer point X perpendicular to the horizon corresponds to the rate of change of descent track heading error.

To make a successful approach run the pilot, must, by the operation of his flying controls, apply such rate of change of track heading as will ultimately cause all the errors to be zero at the same time and hold them zero. He can, however, deal first with the ground track error and once it is being held at zero he can then deal with the descent track errors or vice versa. The former order, ground track error first, is generally preferable because this error takes longer to correct.

It is important to note that all three ground track errors (the track error, the track heading error and the rate of change of the track heading error) must become zero at the same time, for otherwise a straight ground track cannot be held. Clearly, if at any instant the ground track error alone be zero the aircraft is then passing through the localiser plane at a constant or changing rate. If at any instant the ground track heading error alone be zero the aircraft is flying parallel to the localiser plane. If at any instant the rate of change of ground track heading error alone be zero the aircraft is then flying along a straight track. Also, if, at any instant both ground track error and ground track heading error be zero, nevertheless, unless the rate of change of track heading error be zero as well, the aircraft is then so to speak just touching or glancing off the localiser plane. If at any instant both ground track error and rate of change of ground track heading error be zero, nevertheless, unless the track heading error be zero as well, the aircraft is then flying through the localiser plane along a straight track. If at any instant track heading error and rate of change of track heading error be zero, nevertheless, unless the track error be zero as well, the aircraft is then flying parallel to the localiser plane at some distance from it.

Similarly, the descent track error, the descent track heading error and the rate of change of descent track heading error must all three become zero at the same time if a straight descent track is to be held.

In other words, in order to close and hold the desired ground and descent tracks, the pilot must, in each case, use such track heading as will (a) reduce the track error and before the track error becomes zero he must (b) decrease the track heading error at a rate which he must (c) progressively reduce so that as the track error reaches zero so also do the track heading error and the rate of change of track heading error.

Figure 4 is the perspective picture when all errors are reduced to and held at zero. When ground track errors are all three zero but no descent track error is zero, the image of the runway will be symmetrical about the line AV but the streamer point X and the image 34 of the horizontal track of the glide slope containing the aiming point image A will be displaced vertically from the imaginary datum GS to extents and in senses depending upon the descent situation.

In Figures 3 and 4 the motions (in the streamer pattern) away from the streamer point X of points in the image 32 of the runway are indicated by arrows. In Figure 3 the angle GTE between the runway line image 33 and the perpendicular to the horizon image 31 corresponds to ground track error. The distance GTHE parallel to the horizon image 31 from the vanishing point V at which the runway line image 33 meets the horizon image 31 corresponds to ground track heading error. The rate at which the streamer point X moves parallel to the horizon image 31 corresponds to the rate of change of ground track heading error. Similarly, in Figure 3 the distance DTE of the aiming point image A from the datum GS corresponds to descent track error. The distance DTHE of the streamer point X from the datum GS corresponds to descent track heading error. The rate at which the streamer point X moves perpendicularly to the horizon image 31 corresponds to the rate of change of descent track heading.

A preferred reverse presentation (analogous to perspective projection on to the pilot's picture plane as in Figures 3 and 4) indicative of ground track error and ground track heading error, comprises (see Figure 5) an upright and central fixed indicator element 51, which may be regarded as analogous to the pilot's perspective plane image of an upright reference which is fixed with respect to the aircraft, and a movable element 52, which may be regarded as analogous to the picture plane image 33 (Figure 3) of the runway line. The movable element 52 swings pendulum-fashion from upright about a pivot 53, and the pivot 53 moves laterally from the fixed element 51 to either side.

Figures 5, 6:
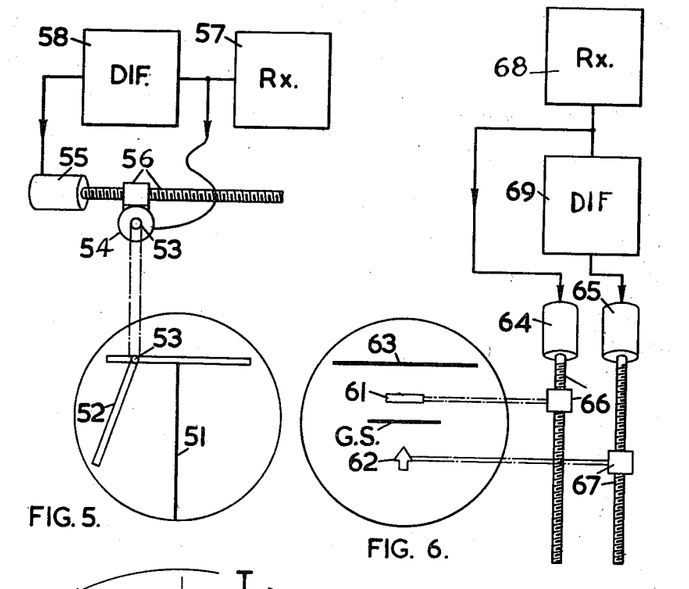
Figures 5 is a face view of a preferred form of reverse presentation (analogous to perspective projection on to the pilot's picture plane) indicative of ground track and ground track heading error and including a block diagram representation of means for effecting indicator element motions.
Figure 6 is a face view of a preferred form of reverse presentation (analogous to perspective projection on to the pilot's picture plane) indicative of descent track and descent track heading error and including a block diagram representation of means for effecting indicator element motions.

Figure 5 shows a servo motor 54 for swinging the element 52 and a servo motor 55 and associated lead screw mechanism 56 for moving its pivot 53 (together with the servo motor 54) laterally and, for controlling the servo motors 54 and 55, a radio receiver, indicated at 57, is connected directly with the swinging servo motor 54 and by way of a differentiator indicated at 58 with the pivot moving servo motor 55. The receiver 57 provides at its output an amount signal which is a function of the angular displacement of an aircraft in which it is installed from a localiser radio beam about the source of said beam. The apparatus is set up so that the swinging element 52 is upright when this amount signal is zero and is swung from upright as said amount signal changes. The differentiator 58 provides at its output a rate signal which is a function of the rate of change of said angular displacement. The apparatus is set up so that the pivot 53 is moved left or right from the fixed element 51 as said rate signal changes. The angular displacement from upright of the swinging element 52 is indicative of ground track error (GTE Figure 3). The position of the pivot 53 with respect to the fixed element 51 is indicative of ground track heading error (GTHE Figure 3) as also, incidentally, is the rate of swing of the moving element 52. The rate of lateral motion of the pivot 53 is indicative of rate of change of ground track heading error.

The reverse presentation (analogous to projection on to the pilot's picture plane as in Figures 3 and 4) indicative of descent track error and descent track heading error, shown in Figure 6 differs from the other three presentations of Figures 1, 2 and 5 in that it has no swinging indicator element, and the means for operating it shown in Figure 6 are correspondingly different from the operating means shown in Figures 1, 2 and 5.

The Figure 6 presentation comprises a transverse "aiming point" indicator element 61, which may be regarded as analogous to the horizontal trace (containing the aiming point) of the glide slope and an arrow head indicator element 62, whose tip may be regarded as analogous to the streamer point, both of which elements 61 and 62 are movable up and down with reference to a fixed horizon element 63 (31 Figure 3), and, a datum indicator element GS fixed at a distance below the horizon element 63 to be indicative of the glide slope and correspond to the imaginary datum GS in Figures 3 and 4.

Figure 6 shows servo motors 64 and 65 with associated lead screw mechanisms 66 and 67 for moving the elements 61 and 62, respectively, and a radio receiver, indicated at 68 which is connected directly with the servo motor 64 for moving the aiming point indicator 61 and by way of a differentiator 69 with the servo motor 64 for moving the streamer point indicator 62. The receiver 68 provides at its output an amount signal which is a function of the angular displacement of an aircraft in which it is installed from a glide slope radio beam about the source of said beam. The apparatus is set up so that the aiming point element 61 is on the fixed glide slope datum element GS when said amount signal is zero and is moved up and down from said fixed element GS as said amount signal changes. The differentiator 68 provides at its output a rate signal which is a function of the rate of change of said angular displacement of the aircraft. The apparatus is set up so that the streamer point element 62 is moved up or down from the datum element GS as said rate signal changes. The position of the aiming point element 61 with respect to the fixed element GS is indicative of descent track error (DTE Figure 3). The position of the streamer point element 62 with respect to the fixed element GS is indicative of descent track heading error (DTHE Figure 3) as also, incidentally, is the rate of motion of the aiming point element 61. The rate of motion of the streamer point element 62 is indicative of rate of change of descent track heading error.

The plan and side elevational direct ground track and descent track presentations of Figures 1 and 2 do not lend themselves to superposition in a single combined presentation, but the reverse presentations of Figures 5 and 6 may together comprise the single combined ground track and descent track reverse presentation shown at Figure 7 in which the same parts are indicated by the same references.

Figure 8:
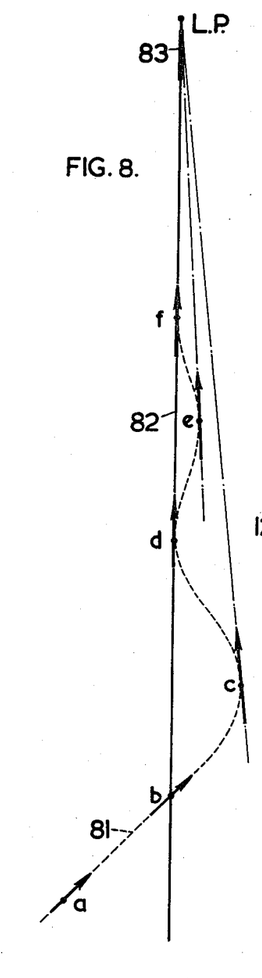
Figure 8 shows in plan an imaginary approach path.
Figures 10, 12:
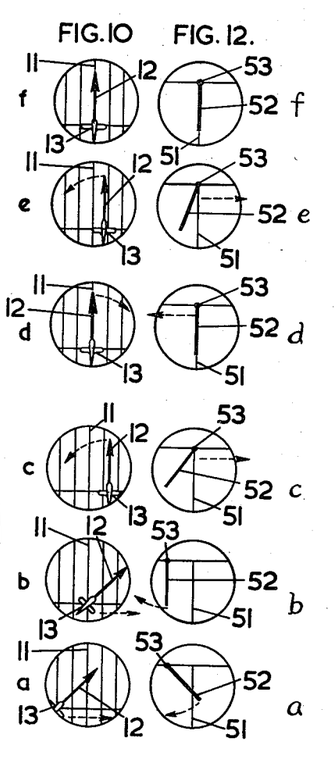

Referring now to Figures 8, 10 and 12, in Figure 8 an imaginary ground track is indicated by the broken line 81, the runway line at 82 and the runway at 83. The ground track 81 is chosen as illustrative of the invention and is not typical of an actual approach track, it is, moreover, greatly exaggerated as regards the ground track errors involved.

The amount of signal referred to above in connection with Figures 1, 2, 5 and 6 is always a function of angular displacement of an aircraft from a radio beam about the source of the beam and so is always of the same sign as the actual displacement perpendicular to the beam (track error) and zero whenever said actual displacement is zero.

The rate signal, however, may be a function of a time differential of said angular displacement such that it is zero whenever the tangent to the track of the aircraft passes through the source of the beam and remains zero for flight along any straight track, such as c—LP Figure 8, through the source of the beam.

Alternatively, the rate signal may be a function of the algebraic sum of a time differential of the angular displacement and the angular displacement itself which function is such that it is zero whenever the tangent to the track of the aircraft is parallel to the radio beam and remains zero for flight along any straight track parallel to the beam.

Figure 9:
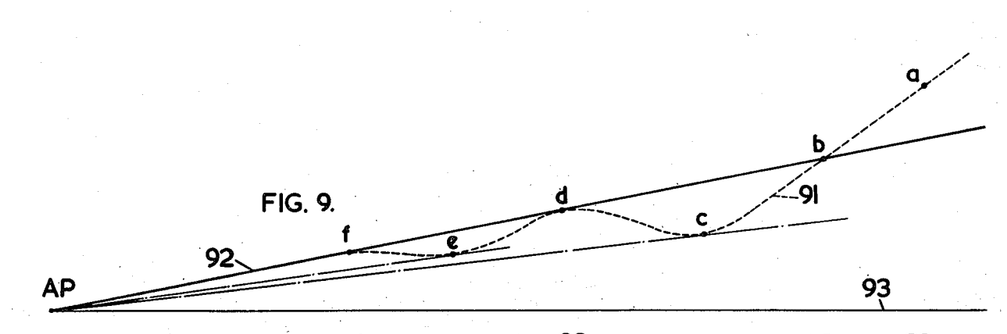
Figure 9 shows in elevation on the localiser plane an imaginary approach path.
Figure 11:
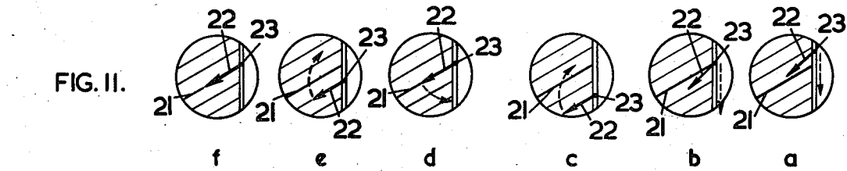
Figure 13:
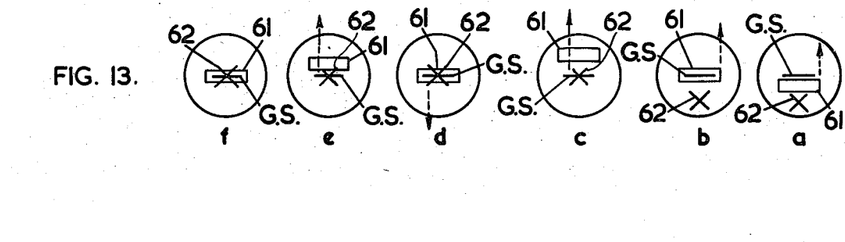

The former alternative for the rate signal is assumed in respect of Figures 8, 10 and 12, and in respect of Figures 9, 11 and 13 as well.

Figures 10a, 10b, 10c, 10d, 10e and 10f show the appearance of the direct ground track presentation of Figure 1 corresponding to points a, b, c, d, e and f of the ground track 81 and Figures 12a, 12b, 12c, 12d, 12e and 12f show the appearance of the reverse ground track presentation of Figure 5 corresponding to said points a–f as follow:

(a) The aircraft is to the left of the runway line 82 and flying rightwards towards it in a straight line.

In Figure 10a the pivot 13 (of Figure 1) is to the left of the fixed element 11 and is moving rightwards towards it, whilst the swinging element 12 is pointing rightwards towards the fixed element 11 but is not swinging.

In Figure 12a the swinging element 51 (of Figure 5) is angularly displaced rightwards from upright and is swinging leftwards, whilst the pivot 53 is to the left of the fixed element 52 and is not moving.

(b) The aircraft has reached the localiser plane and is still flying rightwards in the same straight line.

In Figure 10b the pivot 13 is on the fixed element 11 and is moving rightwards, whilst the swinging element 12 is still pointing rightwards in the same direction and not swinging.

In Figure 12b the swinging element 52 is now upright but still swinging leftwards and the pivot 53 is still the same distance to the left of the fixed element 51 and not moving.

(c) The aircraft is now to the right of the localiser plane and is turning left towards it, its instantaneous direction of flight being towards the source LP of the localiser plane (tangent to track at c passes through LP).

In Figure 10c the pivot 13 is to the right of the fixed element 11 but has reached the end of its rightwards movement. It is about to move leftwards. The moving element 12 is upright, parallel with the fixed element 11. It is now swinging leftwards.

In Figure 12c the moving element 52 is now to the left of upright and has reached the end of its leftwards travel. It is about to move rightwards. The pivot 53 is on the fixed element 51 and is moving rightwards.

(d) The aircraft is so to speak just touching and glancing off the localiser plane and turning rightwards.

In Figure 10d the pivot 13 is again on the fixed element 11 and, having just stopped moving leftwards, is about to move rightwards. The moving element 12 is coincident with the fixed element but is swinging rightwards.

In Figure 12d the moving element 52 is coincident with the fixed element 51 and is not swinging, but the pivot 53 is now moving leftwards.

(e) The aircraft is again to the right of the runway line, but at a less distance from it than point c, and is turning leftwards towards it, its instantaneous direction of flight being again towards the localiser beam source LP (tangent to track at e passes through LP).

In Figure 10e the pivot 13 and the moving element 11 are as in Figure 10c except that the pivot's displacement and the swinging element's rate of swing are less.

In Figure 12e the moving element 52 and the pivot 53 are as in Figure 12c except that the moving element's displacement and the pivot's rate of motion are less.

(f) The aircraft is flying in and holding the localiser plane.

In both Figures 10f and 12f the moving elements are coincident with the fixed elements, respectively, and both said moving elements and the pivots are at rest.

Turning now to Figures 9, 11 and 13, in Figure 9 an imaginary descent track is indicated by the broken line 91, the trace of the glide slope on the localiser plane at 92, the runway at 93, and the aiming point at AP. The descent track 91 is chosen as illustrative of the invention and is not typical of an actual approach track, Figure 9, is moreover, greatly exaggerated as regards the descent track errors involved and the glide slope angle.

Figures 11a, 11b, 11c, 11d, 11e and 11f show the appearance of the direct descent track presentation of Figure 2 corresponding to points a, b, c, d, e and f of the descent track 91 and Figures 13a, 13b, 13c, 13d, 13e and 13f, show the appearance of the reverse descent track presentation of Figure 6 corresponding to said points a–f, as follow:

(a) The aircraft is above the glide slope and flying downwards towards it in a straight line.

In Figure 11a the pivot 23 (of Figure 2) is above the fixed element 21 and is moving down, whilst the swinging element 22 is pointing downwards towards the fixed element 21 but is not swinging.

In Figure 13a the aiming point element 61 is below the fixed datum element GS and is moving upwards, whilst the streamer point element 62 is below the aiming point element 61 and at rest.

(b) The aircraft has reached the glide slope and is still flying downwards in the same straight line.

In Figure 11b the pivot 23 is on the fixed element 21 and is still moving down, whilst the swinging element 22 is still pointing down in the same direction and not swinging.

In Figure 13b, the aiming point element 61 is on the datum element GS and still moving upwards, whilst the streamer point element 62 is still in the same position and at rest.

(c) The aircraft is now below the glide slope and is turning upwards towards it, its instantaneous direction of flight being towards the aiming point AP or source of the glide slope beam (tangent to track at c passes through AP).

In Figure 11c the pivot 23 is below the fixed element 21 but has reached the end of its downward movement. It is about to move upwards. The swinging element 22 is parallel to the fixed element 21. It is now swinging upwards.

In Figure 13c the aiming point element 61 is above the fixed datum element GS and at rest while the streamer point element 62 is coincident with the datum element GS and moving upwards.

(d) The aircraft is so to speak just touching and glancing off the glide slope and turning downwards.

In Figure 11d the pivot 23 is again on the fixed element 11 and having just stopped moving upwardly is about to move downwardly, whilst the swinging element 22 is coincident with the fixed element 11 but is swinging downwards.

In Figure 13d the aiming point element 61 and the streamer point element 62 are coincident with one another and with the fixed datum element GS. The aiming point element 61 is at rest but the streamer point element 62 is moving downwards.

(e) The aircraft is again below the glide slope but at a less distance from it than point c, and it is turning upwards towards it, its instantaneous direction of flight being towards the aiming point AP (tangent to track at e passes through AP).

In Figure 11e the pivot 23 and the swinging element 22 are as in Figure 11c except that the pivot's displacement and the swinging element's rate of swing are less.

In Figure 13e the aiming point element 61 is above the fixed datum GS and at rest and the streamer point element 62 is coincident with the fixed datum element GS and is moving upwards at a less rate than in Figure 13c.

(f) The aircraft is flying in and holding the glide slope.

In both Figures 11f and 13f the moving elements are coincident with the fixed elements, respectively, and at rest.

In regard to Figures 6 and 13, it is to be noted that continuing coincidence of the streamer point element 62 with the fixed datum GS signifies flight along a straight descent track which passes through the aiming point, and that continuing coincidence of the streamer point element 62 with fixed datum GS and with the aiming point element 61 at a small distance from the datum element GS will suffice for a successful approach run for which some departure from a given glide slope is permissible and may even be desirable for some aircraft. For this reason, it may be preferred to omit the datum element GS as such, so that the pilot may imagine one centrally of, or at an appropriate distance below, a fixed horizon element such as 63.

In Figures 1 and 10 there are shown two subsidiary fixed elements 11R and 11L at each side of, and parallel to, the fixed central element 11. Coincidence of the swinging element 12 with any of these (or with imagined interpolated parallel lines) is indicative of zero track heading error. Similar subsidiary fixed elements 21A and 21B are shown in Figures 2 and 11. Such subsidiary elements are not, however, useful in the presentation of Figure 5.

As already stated, it is assumed in respect of Figures 8 to 13 that the rate signal is a function of a time differential of angular displacement of an aircraft from a radio beam about the source of said beam such that it is zero whenever the tangent to the track of the aircraft passes through the source of the beam.

However, a gyroscope or other directional reference datum device in an aircraft conveniently affords a rate signal which is a function of the heading of the aircraft with respect to the datum of the device and is thus the same as the alternative rate signal mentioned above which is a function of the algebraic sum of a time differential of the angular displacement of the aircraft from a radio beam and said angular displacement itself.

Figure 14:
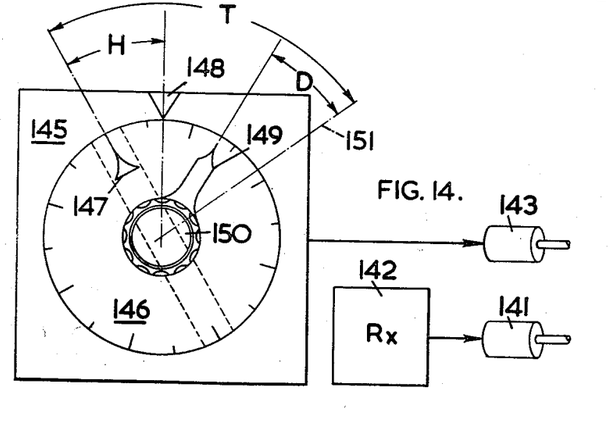
Figure 14 shows diagrammatically one arrangement in which a track heading error signal is derived from a gyroscope or other directional datum device.

Figure 14 illustrates an arrangement, applicable to any of the presentations of Figures 1, 2, 5 and 6, in which such "alternative" rate signal is derived from a gyroscope or other directional reference datum device. As shown, an "amount" servo motor 141 (equivalent to the servo motors 15 Figure 1, 25 Figure 2, 54 Figure 5 or 64 Figure 6) is controlled by the signal from a radio receiver 142 (corresponding to the receiver 17 Figure 1, 27 Figure 2, 57 Figure 5 or 68 Figure 6); and a "rate" servo motor 143 (corresponding to the servo motor 14 Figure 1, 24 Figure 2, 55 Figure 5 or 65 Figure 6) is connected for control with the output of a gyroscope or other directional reference datum device, indicated generally at 145, which provides at its output a signal according to a function of the aircraft's heading with respect to the datum afforded by said device, said datum being adjustable.

The datum device 145 has an indicator "card" 146 whose orientation about its centre is maintained constant to afford the datum. The angle between a mark 147 on the card 146 and a mark 148 on the casing of the device 145 is the aircraft's heading angle with respect to the mark 147. In addition, the card 146 has rotatable therewith a datum pointer 149 which is adjustable, as by means of a knob 150 which also enables it to be temporarily disengaged from the card 146, in relation to the card marked 147 about the centre of the card 146, to adjust the datum.

In the absence of any wind, the datum pointer 149 is set so that it is parallel to a desired ground or descent track e. g. as defined by a radio beam, and the rate signal at the rate servo motor 143 then varies with a function of the aircraft track heading error relative to the datum pointer 149, the heading error being the same as the track heading error in the absence of wind.

In the presence of wind which is the same at all heights, the datum pointer 149 is set to a position displaced from such parallelism by the drift angle of the aircraft for said wind when flying parallel to the desired track, and so the rate signal at the servo motor 143 still varies in accordance with the track heading error.

However, in practice, because the wind is usually not the same at all heights concerned, the datum pointer 149 is displaced from parallelism to a desired track by an angle equal to the drift angle of the aircraft for ground wind when flying parallel to the desired track. Because of this, there will be a datum error which changes with height and becomes zero when the aircraft reaches the height at which the ground wind was measured, and until he reaches this height the pilot will find it impossible to hold the indicators stationary with zero track error indication unless the indication corresponding to track heading error is other than zero. However, such, other than zero, indication corresponding to track heading error will as a rule be small and usually progressively decreasing and it does not greatly matter if, for example, the swinging element 11 of Figures 1 and 10 oscillates through a small angle about the pivot 13, so long as said pivot 13 remains close to the fixed element 11 until the aircraft reaches the height of ground wind measurement, when coincidence of the swinging and fixed elements 12 and 11 will enable them to be kept stationary.

In Figure 14, the angle H between the marks 147 and 148 is an aircraft heading angle, the angle T between the mark 147 and a line 151 which passes through the centre of the card 146 and is parallel to a desired track is one through which the datum pointer 149 might be displaced from the card mark 147 for parallelism with a desired track, the angle D is a drift angle through which the pointer 149 is displaced from such parallelism to allow for wind as above explained.

It will be apparent to those skilled in the art that, if desired, provision can be made for automatically adjusting or setting in the datum by radio from the ground.

It may be emphasized here that the presentation of an indicator according to the invention does not indicate actual track heading errors and track errors. This is of no great significance because if a pilot reacts to the indications that it does present in the same way as he would to the actual errors, he will achieve his object, which is to establish an end condition in which all the errors—track error, track heading error and rate of change of track heading error—are held at zero. Owing to the small angle included between a radio beam and a line joining its source to a track position of an aircraft commencing an approach run, there is little difference between the track heading of the aircraft when flying parallel to the beam and when flying along a straight track through the source of the beam. Moreover, an indicator according to the invention presents a clear and definite indicator element-position which is indicative of track heading error—which way the pilot is going—as well as a clear and definite indicator element-position which is indicative of track error—where the pilot is in relation to a radio beam.

The actual coupling of the moving indicator elements for operation under the control of amount and rate signals as set forth herein may take any convenient form. Various possible forms of coupling will occur to those skilled in the art and no claim is made to any particular form of coupling as such.

Figure 15:
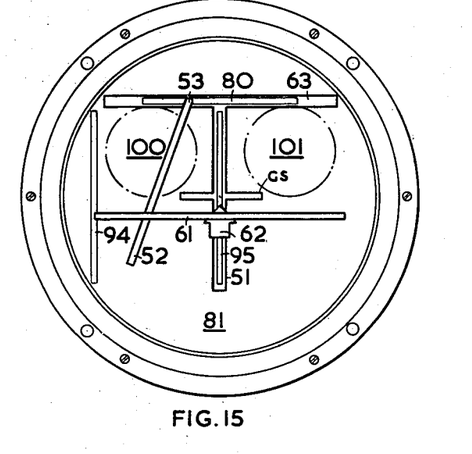
Figures 15, 16 and 17 show one instrument having the combined reverse presentation of Figure 7 in face view, in sectional elevation and in sectional plan, respectively, parts being omitted from Figures 16 and 17 for the sake of clearness.
Figure 16:
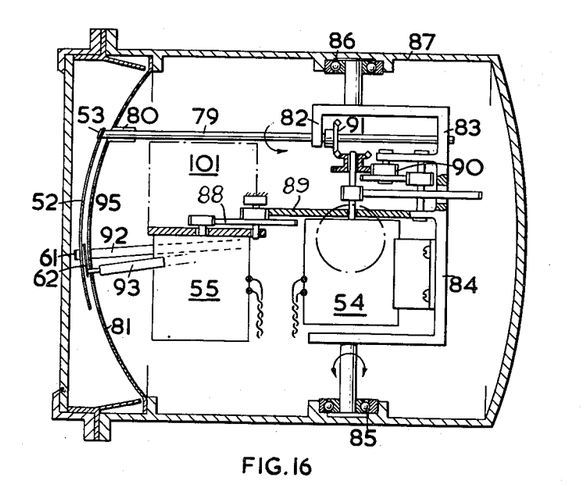
Figure 17:
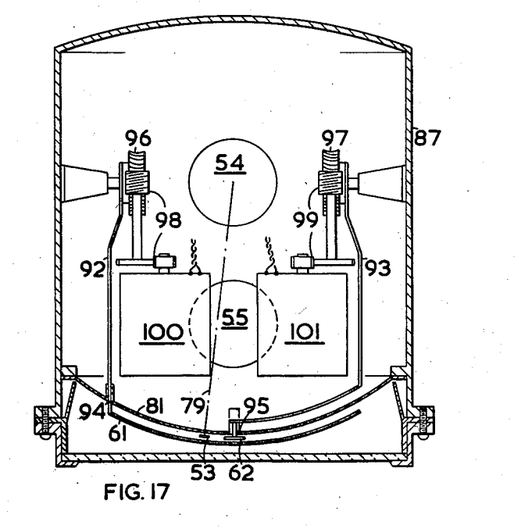
Figure 18:
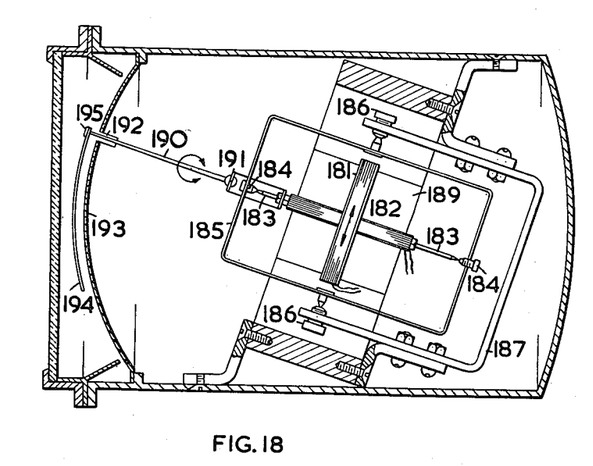
Figure 18 shows in sectional elevation another instrument which may have a presentation such as that of Figure 1, Figure 2 or Figure 5.

However, Figures 15, 16 and 17 show one instrument and Figure 18 shows another instrument including mechanism for operating the moving indicator elements when supplied with appropriate operating electric currents.

Turning now to Figures 15, 16 and 17, the indicator here shown has the presentation of Figure 6 and the same parts thereof are indicated by the same reference numerals. The swinging element 52, see Figure 16, is fast on a spindle 79 extending through a slot 80 in a dial 81 from bearings 82, 83 in a frame 84 which, in turn, is mounted on bearings 85, 86 in the casing 87. The slot 80 extends along the horizon element 63 (Figure 15), and, for moving the pivot 53 (i. e. the upper end of the swinging element 52) transversely of the upright fixed element 51 along the slot 80, an electric servo motor 55 operates through reduction gearing 88 and a quadrant 89 secured to the frame 84. For swinging the element 52 about the pivot 53, an electric servo motor 54 carried by the frame 84 coaxially of its pivots 85, 86 is coupled through reduction gearing, indicated generally at 90, with a bevel wheel 91 fast on the pivot spindle 79. The dial 81 of the indicator is shaped to conform substantially to the surface of an imaginary sphere whose centre is on the axis of the bearings 85, 86, and the swinging indicator element is correspondingly curved as shown in Figure 16. The upwardly and downwardly moving elements 61 and 62, see Figure 17, are carried at the ends of radius arms 92 and 93 which extend from coaxial worm wheels 96, 97 whose common axis intersects (at the centre of said imaginary sphere) that of the bearings 85, 86, Figure 16, and which form parts of reduction gearings 98, 99 through which the moving elements 61 and 62 are operated by servo motors 100 and 101, respectively. The servo motors 100 and 101 are located above the level of the servo motor 55 and associated gearing but below the level of the spindle 79.

It will be apparent that mechanism such as just described for moving the swinging element 52 and its pivot 53 may be employed for effecting the indicator motions of the presentations of Figures 1, 2 and 3. For effecting such indicator motions it is not, however, essential to employ servo motors and gear drives to radius arms. If desired, for example, what may be termed a two axis moving coil instrument movement may be employed instead.

Such a movement is illustrated in Figure 18 of the drawings. In this movement two moving coils 181 and 182 are secured rigidly together with their axes intersecting one another at right angles at a point centrally thereof, to constitute a moving assembly supported by spindles 183, 183 coaxial with the coil 181 in bearings 184, 184 in a gimbal-like rectangular frame 185, which, in turn, has pivots 186, 186 coaxial with the coil 182 in a fixed U-shaped frame 187 which locates the coil assembly 181, 182 centrally between the poles of a permanent magnet 188, one of whose poles is indicated at 189. A radius arm 190 which is rigidly secured by a C-shaped junction piece 191 (to clear the frame 185) to the moving assembly 181, 182 and is coaxial with the spindles 183, 183 and coil 181, extends through a transverse slot 192 in a dial 193 and carries the swinging element, indicated at 194, at its free or "pivot" end 195.

What I claim is:

1. An aircraft pilot's instrument approach indicator comprising two elongated indicator elements, mountings supporting said elements for relative translational motion and relative angular motion, means operative under the control of radio beam signals for effecting relative translational motion of said elements in accordance with a function of angular displacement as such of an aircraft from a radio beam about the source of said beam, and means for effecting relative angular motion of said elements in accordance with a function of rate of change as such of said angular displacement.

2. An aircraft pilot's instrument approach indicator as claimed in claim 1, wherein one of the two elongated indicator elements is fixed and the other has a pivot at one end, said pivot being mounted for movement transversely of the fixed element for the relative translational motion of the two elements with respect to a zero position in register with said fixed element, and the other element being swingable about said pivot for the relative angular motion of the two elements with respect to a zero angular position parallel to the fixed element.

3. An aircraft pilot's instrument approach indicator comprising two elongated indicator elements, mountings supporting said elements for relative angular motion and relative translational motion, means operative under the control of radio beam signals for effecting relative angular motion of said elements in accordance with a function of angular displacement as such of an aircraft from a radio beam about the source of said beam, and means for effecting relative translational motion of said elements in accordance with a function of rate of change as such of said angular displacement.

4. An aircraft pilot's instrument approach indicator as claimed in claim 3 wherein one of the two elongated indicator elements is fixed and the other has a pivot at one end, said pivot being mounted for movement transversely of the fixed element for the relative translational motion of the two elements with respect to a zero position in register with said fixed element, and the other element being swingable about said pivot for the relative angular motion of the two elements.

5. An aircraft pilot's instrument approach indicator comprising, for direct presentation indicative of ground track error and ground track heading error, an upright and central fixed elongated indicator element, a movable elongated indicator element, a pivot, said pivot being mounted for movement transversely of said fixed element and said movable element being carried by and extending from said pivot to swing thereabout, means operative under the control of localiser radio beam signals for moving said pivot from the central element in accordance with a function of the angular displacement as such of the aircraft from the localiser radio beam, and means operative under the control of a rate signal derived from the localiser beam, for swinging the movable element from upright in accordance with a function of rate of change as such of said angular displacement.

6. An aircraft pilot's instrument approach indicator comprising for direct presentation indicative of ground track error and ground track heading error, an upright and central fixed elongated indicator element, a movable elongated indicator element, a pivot, said pivot being mounted for movement transversely of said fixed element and said movable element being carried by and extending from said pivot to swing thereabout, means operative under the control of localiser radio beam signals for moving said pivot from the central element in accordance with a function of the angular displacement as such of the aircraft from the localiser radio beam, and means, operative under the control of a signal derived from a directional reference datum device on the aircraft, for swinging the movable element from upright in accordance with a function of rate of change as such of said angular displacement.

7. An aircraft pilot's instrument approach indicator comprising, for direct presentation indicative of descent track error and descent track heading error, a transverse and central fixed elongated indicator element, a movable elongated indicator element, a pivot, said pivot being mounted for movement transversely of said fixed element and said moving element being carried by and extending from said pivot to swing thereabout, means operative under the control of glide slope radio beam signals for moving said pivot from the central element in accordance with a function of angular displacement as such of the aircraft from the glide slope beam about the source of said beam, and means operative under the control of a rate signal derived from the glide slope radio beam, for swinging the movable element from parallelism with the central fixed element in accordance with a function of rate of change as such of said angular displacement.

8. An aircraft pilot's instrument approach indicator comprising, for direct presentation indicative of descent track error and descent track heading error, a transverse and central fixed elongated indicator element, a movable elongated indicator element, a pivot, said pivot being mounted for movement transversely of said fixed element and said moving element being carried by and extending from said pivot to swing thereabout, means operative under the control of glide slope radio beam signals for moving said pivot from the central element in accordance with a function of angular displacement as such of the aircraft from the glide slope beam about the source of said beam, and means, operative under the control of a signal derived from a directional reference datum device on the aircraft, for swinging the movable element from parallelism with the central fixed element in accordance with a function of rate of change as such of said angular displacement.

9. An aircraft pilot's instrument approach indicator comprising, for reverse presentation indicative of ground track error and ground track heading error, an upright and central fixed elongated indicator element, a movable elongated indicator element, a pivot, said moving element being carried by and extending from said pivot to swing thereabout and said pivot being mounted for movement transversely of said fixed element, means operative under the control of localiser radio beam signals for swinging the movable element from upright in accordance with a function of angular displacement as such of an aircraft from the localiser beam about the source of said beam, and means operative under the control of a rate signal derived from the localiser radio beam, for moving the pivot from the fixed element in accordance with a function of rate of change as such of said angular displacement.

10. An aircraft pilot's instrument approach indicator comprising, for reverse presentation indicative of ground track error and ground track heading error, an upright and central fixed elongated indicator element, a movable elongated indicator element, a pivot, said moving element being carried by and extending from said pivot to swing thereabout and said pivot being mounted for movement transversely of said fixed element, means operative under the control of localiser radio beam signals for swinging the movable element from upright in accordance with a function of angular displacement as such of an aircraft from the localiser beam about the source of said beam, and means operative under the control of a signal derived from a directional reference datum device on the aircraft, for moving the pivot from the fixed element in accordance with a function of rate of change as such of said angular displacement.

11. Aircraft pilot's instrument approach indicator apparatus having two direct presentations indicative of ground track and ground track heading error and of descent track and descent track heading error, respectively, and each of which presentations comprises a central fixed elongated indicator element, a pivot movable transversely of the fixed element, and a movable indicator swingable about said pivot, means operative under the control of localiser and glide slope radio beam signals for translationally moving said pivots from said fixed elements in accordance with functions of angular displacement as such of the aircraft from the localiser and glide slope beams about the sources of said beams respectively and means, operative under the control of rate signals derived from the localiser and glide slope beams, respectively, for swinging the movable elements about the pivots from parallelism with the fixed elements in accordance with functions of rates of change as such of said angular displacements respectively.

12. Aircraft pilot's instrument approach indicator apparatus having two direct presentations indicative of ground track and and ground track heading error and of descent track and descent track heading error, respectively, and each of which presentations comprises a central fixed elongated indicator element, a pivot movable transversely of the fixed element, and a movable indicator swingable about said pivot, means operative under the control of localiser and glide slope radio beam signals for moving said pivots from said fixed elements in accordance with functions of angular displacement as such of the aircraft from the localiser and glide slope beams about the sources of said beams respectively and means operative under the control of respective signals derived from a directional reference datum device on the aircraft for swinging the movable elements about the pivots from parallelism with the fixed elements in accordance with functions of rates of change as such of said angular displacements respectively.

13. Aircraft pilot's instrument approach indicator apparatus having a combined reverse presentation indicative of ground track error and ground track heading error and of descent track error and descent track heading error, respectively, comprising an upright central fixed elongated indicator element, a pivot movable transversely of said upright fixed element, a movable elongated indicator element, carried by and extending from said pivot, a fixed datum indicator element, a first up and down movable element and a second up and down movable element, means operative under the control of localiser and glide slope radio beam signals for swinging said movable element about said pivot and moving said first up and down movable element in accordance with functions of angular displacement as such of the aircraft from the localiser and glide slope beams about the sources of said beams respectively, and means, operative under the control of rate signals derived from the localiser and glide slope beams, respectively, for moving said pivot transversely and for moving said second up and down movable element in accordance with functions of rate of change as such of said angular displacements, respectively.

14. Aircraft pilot's instrument approach indicator apparatus having a combined reverse presentation indicative of ground track error and ground track heading error and of descent track error and descent track heading error, respectively, comprising an upright central fixed elongated indicator element, a pivot movable transversely of said upright fixed element, a movable elongated indicator element carried by and extending from said pivot, a fixed datum indicator element, a first up and down movable element and a second up and down movable element, means operative under the control of localiser and glide slope radio beam signals for swinging said movable element about said pivot and moving said first up and down movable element in accordance with functions of angular displacement as such of the aircraft from the localiser and glide slope beams about the sources of said beams, respectively, and means operative under the control of signals derived from directional reference datum devices in the aircraft, for moving said pivot transversely and for moving said second up and down movable element in accordance with functions of rates of change as such of said angular displacements, respectively.

15. Indicator apparatus as claimed in claim 13, including a transverse fixed indicator element positioned above the fixed datum indicator element such that the former is representative of the horizon and the latter is representative of the glide slope, and wherein the pivot is movable along said transverse horizon representative element.

16. Indicator apparatus as claimed in claim 14 including a transverse fixed indicator element positioned above the fixed datum indicator element such that the former is representative of the horizon and the latter is representative of the glide slope, and wherein the pivot is movable along said transverse horizon representative element.

17. An aircraft pilot's instrument approach indicator comprising two elongated indicator elements, mountings supporting said elements for relative translational motion and relative rotational motion, means for effecting said relative translational motion, a second means for effecting said relative rotational motion, one of said means functioning with respect to track error, as such, the other of said means functioning with respect to track heading error, as such.

18. An aircraft pilot's instrument approach indicator comprising two elongated indicator elements, mountings supporting said elements for relative translational motion and relative rotational motion, means for effecting relative translational motion of said elements in accordance with a function of track error, as such, and means for effecting relative rotational motion of said elements in accordance with a function of track heading error, as such.

19. An aircraft pilot's instrument approach indicator for reverse presentation comprising two elongated indicator elements, mountings supporting said elements for relative translational motion and relative angular motion, means for effecting relative angular motion of said elements in accordance with a function of track error, as such, and means for effecting relative translational motion of said elements in accordance with a function of track heading error, as such.

References Cited in the file of this patent

UNITED STATES PATENTS

| | | |
|---|---|---|
| 1,436,280 | Minorsky | Nov. 21, 1922 |
| 1,703,280 | Minorsky | Feb. 26, 1929 |
| 1,958,258 | Alexanderson | May 8, 1934 |
| 2,043,336 | Sjostrand | June 9, 1936 |
| 2,423,336 | Moseley | July 1, 1947 |
| 2,502,721 | Halpert | Apr. 4, 1950 |
| 2,548,278 | Wirkler | Apr. 10, 1951 |
| 2,569,328 | Omberg | Sept. 25, 1951 |
| 2,613,350 | Kellogg | Oct. 7, 1952 |
| 2,613,351 | Lang | Oct. 7, 1952 |
| 2,613,352 | Kellogg | Oct. 7, 1952 |
| 2,644,941 | Kellogg | July 7, 1953 |

FOREIGN PATENTS

| | | |
|---|---|---|
| 516,567 | Great Britain | Jan. 5, 1940 |
| 594,484 | Great Britain | Nov. 12, 1947 |